United States Patent [19]

Lethellier

[11] Patent Number: 4,602,323

[45] Date of Patent: Jul. 22, 1986

[54] SINGLE-ENDED TRANSFORMER DRIVE CIRCUIT

[75] Inventor: Patrice R. Lethellier, Tamarac, Fla.

[73] Assignee: Burroughs Corporation, Detroit, Mich.

[21] Appl. No.: 667,965

[22] Filed: Nov. 5, 1984

[51] Int. Cl.[4] .......................................... H02M 7/537
[52] U.S. Cl. ...................................... 363/131; 363/97
[58] Field of Search .................. 363/20, 21, 24, 25, 363/95, 97, 131

[56] References Cited

U.S. PATENT DOCUMENTS

| 3,935,526 | 1/1976 | Kamata et al. | 363/21 |
| 4,016,482 | 4/1977 | Cielo et al. | 323/289 |
| 4,017,786 | 4/1977 | Jensen | 363/134 |
| 4,441,146 | 4/1985 | Vinciarelli | 363/20 |

FOREIGN PATENT DOCUMENTS 902167  1/1982  U.S.S.R. .............................. 363/21

Primary Examiner—Peter S. Wong
Assistant Examiner—Judson H. Jones
Attorney, Agent, or Firm—Francis A. Varallo; Kevin R. Peterson

[57] ABSTRACT

A single-ended transformer drive circuit includes a transformer having a primary winding and a secondary winding and a switching transistor connected to the primary winding of the transformer and adapted to turn on and drive the transformer in the forward direction along its hysteresis curve, whereby an output voltage is generated in the secondary circuit of the transformer. An auxiliary transistor circuit is coupled to the transformer for driving it in the reverse direction along its hysteresis curve when the switching transistor turns off, whereby the transformer is reset and prepared for the next cycle of operation when the switching transistor turns on again.

3 Claims, 3 Drawing Figures

SINGLE-ENDED TRANSFORMER DRIVE CIRCUIT

BACKGROUND OF THE INVENTION

In power supplies having push pull drive into a transformer, the transformer can be fully used between the positive maximum flux and the negative maximum flux of the hysteresis curve $-\phi m$ to $+\phi m$. However, in single-ended drive into the transformer, only the positive portion of the hysteresis curve 0 to $+\phi m$ or even less than the full positive portion because of the remanent flux ($\phi r$). In this case, the transformer can only be used or driven between $+\phi r$ and $+\phi m$ which is approximately one-third the magnitude of the path from $-\phi m$ to $+\phi m$ in push-pull operation. Thus, for the same output power and the same kind of ferrite, single-ended forward drive requires a transformer which is about three times larger than that required for push pull drive.

DESCRIPTION OF THE INVENTION

The present invention may be used in many power supply circuits. For purposes of illustration, it is described herein as it is used in a power supply described and claimed in copending application Ser. No. 649,071, filed Sept. 10, 1984, of Patrice R. Lethellier entitled POWER SUPPLY INCLUDING SWITCHING POWER TRANSISTOR and incorporated herein by reference.

Figure 1:
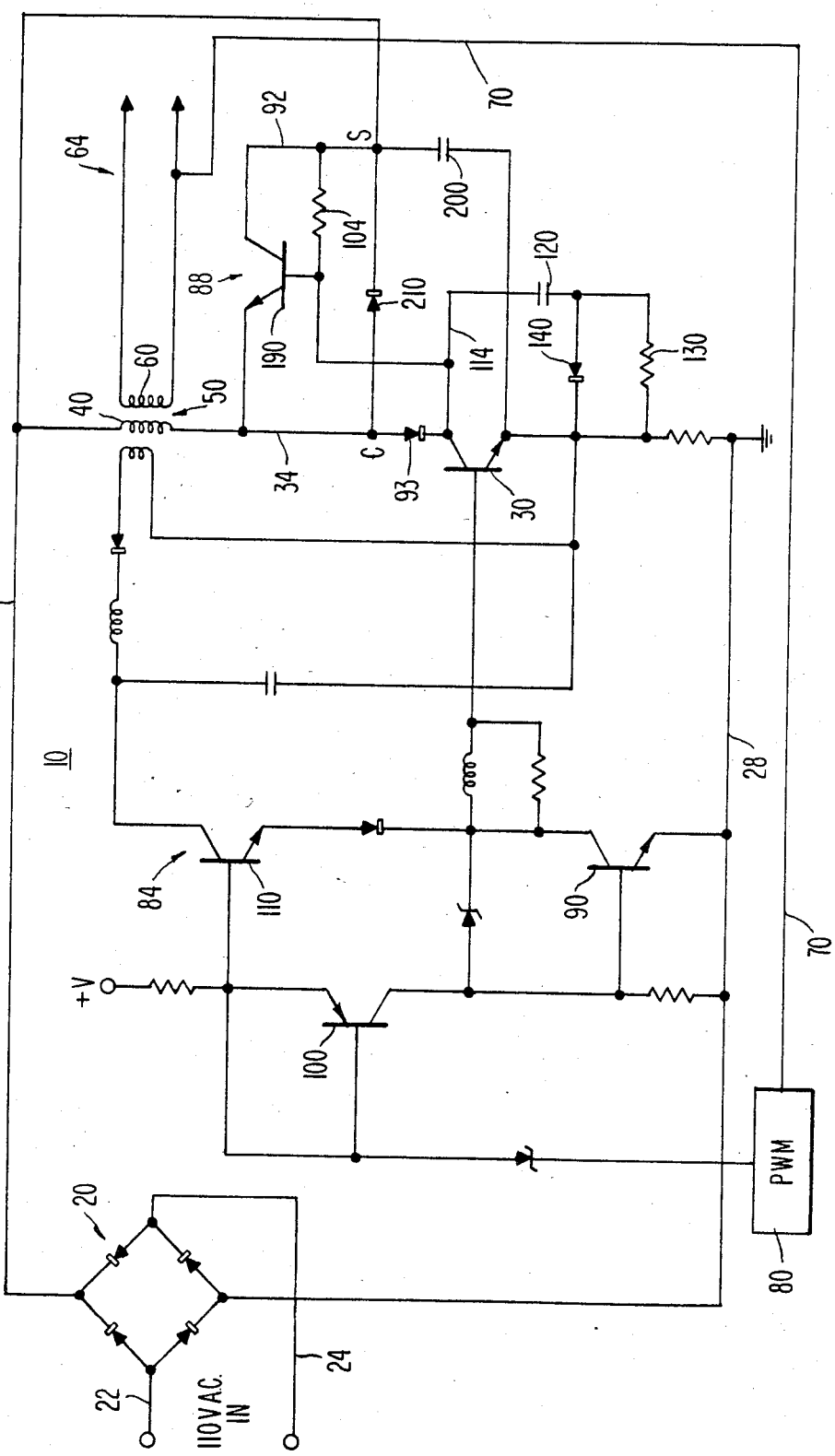
FIG. 1 is a schematic representation of a power supply circuit embodying the principles of the invention.

The circuit 10 shown in FIG. 1 is a portion of the power supply referred to above and embodies the subject invention. The circuit 10 has the conventional 110 volt, 60 cycle A.C. supply coupled to a full rectifier bridge 20 by leads 22 and 24, and leads 26 and 28 run from the bridge to the rest of the circuit. The circuit includes a power switching transistor 30 having its collector connected by lead 34 to one end of the primary winding 40 of a transformer 50, the other end of which is connected to lead 26.

The secondary winding 60 of the transformer 50 is coupled to a secondary circuit 64 which provides the D.C. output of the system 10 and includes various filtering arrangements and the like, as is well known in the art. A feedback lead 70 is coupled from the secondary circuit 64 through a control circuit 80, which is a pulse width modulator (PWM), to the input of a base drive circuit 84 for the transistor 30. Circuit 80 produces a waveform comprising positive and negative generally rectangular pulses.

The drive circuit 84 includes transistors 90, 100, and 110 which are used to drive switching power transistor 30. This circuit 84 is not described in detail herein since it is described in the above-mentioned application.

In the circuit 10, transistor 30 is connected for single-ended drive and, according to the invention, to optimize the operation of the circuit 10 and, particularly, the transformer 50; a circuit portion 88 is connected in operative relation with drive transistor 30. The circuit portion 88 includes an NPN transistor 190 having its emitter connected to lead 34. A Schottky diode 93, oriented as shown, is connected in lead 34 to the collector of transistor 30.

The collector of transistor 190 is connected by lead 92 and capacitor 200 to the emitter of transistor 30. Lead 92 is also connected to lead 26. The base of transistor 190 is connected to lead 102 which runs from the collector of transistor 30 through a resistor 104 to lead 92 and thus to the collector of transistor 190. A diode 210 is connected between lead 34 and lead 92.

The collector of transistor 30 is connected by lead 114 and through capacitor 120 and the paralleled resistor 130 and diode 140 to the emitter of transistor 30. This is a protective circuit.

Figure 2:
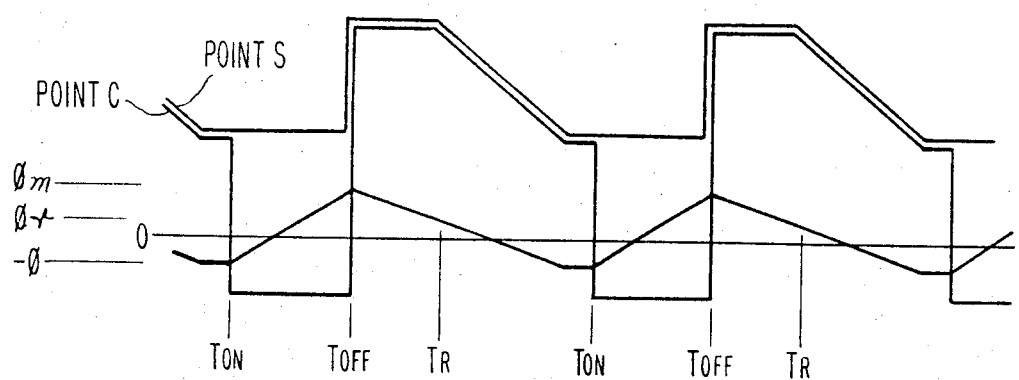
FIG. 2 shows some of the waveforms which appear in the circuit of FIG. 1.

FIG. 2 shows the voltage waveforms at points S and C in FIG. 1. $T_{ON}$ represents turn on of transistor 30 and $T_{OFF}$ is the point of turn off of transistor 30. $T_R$ is the point at which the flux in transformer 50 reaches $+\phi r$.

In the circuit of FIG. 1, which is a single-ended forward converter, only the positive side of the characteristic curve of the transformer 50 can be used to obtain output power. In actual fact, the output is somewhat less than maximum since there is always remanent flux ($+\phi r$) in the transformer which can only be used between $+\phi r$ and $+\phi m$ which is perhaps one-third of the transformer usage obtained with push-pull or double-ended drive.

In operation of circuit 10, the PWM 80 puts out an alternating signal of positive and negative rectangular pulses. When a positive pulse is the output, transistors 100 and 90 are turned off, transistor 110 is turned on, and current flows through transistor 110 into the base of transistor 30 and turns on transistor 30, which generates voltage across the primary winding 40, and an output voltage is produced in the secondary 64 of the system.

When transistor 30 turns on, there is a forward drop across diode 93 due to current flow in the path including transformer winding 40, diode 93 and transistor 30. This current flow reverse biases the base emitter junction of transistor 190 which is held off.

When PWM 80 puts out a negative pulse, transistors 100 and 90 turn on, transistor 110 turns off, and transistor 30 turns off. When transistor 30 turns off, the energy stored in the leakage inductance of the transformer 50 charges the capacitor 200 through diode 210, and this counteracts the reverse voltage across diode 93 which had held transistor 190 off. Now, current flows through resistor 104, and some of this current is fed into the base of transistor 190 which turns ON and stays on during the period $T_R T_{ON}$ (FIG. 2). During this period when transistor 190 is on, point C is shorted to point S and is kept positive by the charge stored in capacitor 200. Also, when transistor 190 is turned on, current flows through transformer winding 40 in the opposite direction than when transistor 30 turns on, whereby negative or reverse flux is generated in winding 40, and this resets the transformer and prepares it for the next cycle of operation when transistor 30 turns on.

Thus, the provision of means for driving the transformer slightly negative and resetting it makes it possible to decrease the size of the transformer or to increase the output power which can be handled in the transformer.

A MOSFET can be used in place of transistor 190, in which case, resistor 104 can be larger and will dissipate less power. Other minor changes may also be required in the circuit.

Figure 3:
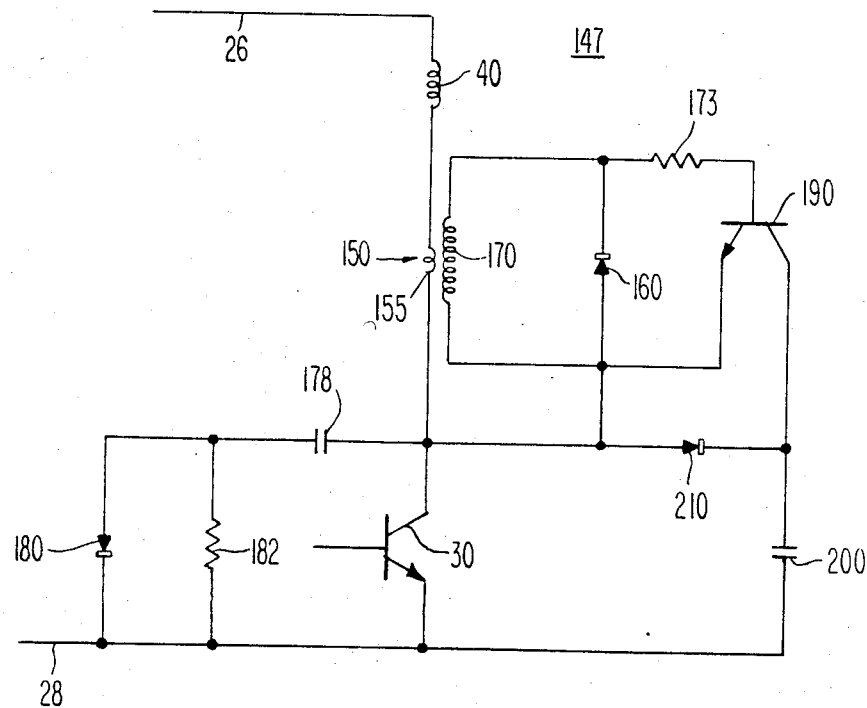
FIG. 3 is a schematic circuit of a modification of the invention.

For power supplies of relatively high power, the energy lost in diode 210 may become significant, in which case, the modified circuit portion 147 shown in FIG. 3 may be used in association with transformer 50. In FIG. 3, a small current transformer 150 is used to drive transistor 190, and the collector of transistor 30 is coupled through the primary winding 155 of the current transformer 150 to the primary winding 40 of transformer 50, as above. Transistor 190 has its emitter coupled through the secondary winding 170 of transformer 150 and resistor 173 to its base, and a diode 160 is connected across secondary winding 170. Diode 210 is oriented as shown and connected to the collector of transistor 30 and to the emitter of transistor 190.

The collector of transistor 30 is also connected to lead 28 through a dephasing network 174 including a capacitor 178 in series with a parallel diode 180 and resistor 182. This dephasing network serves to minimize power loss during turn-off of transistor 30 but is not required in practicing the invention.

In operation of the circuit 147 of FIG. 3, when switching transistor 30 has been turned on and current is flowing, the current transformer 150 couples current through diode 160, and this current biases the base of transistor 190 in the reverse direction, and it is held off.

When transistor 30 is off and capacitor 200 has been recharged, the voltage of the collector of transistor 30 tends to drop, and a small reverse current coming through the dephasing network 174 passes through the primary winding of the current transformer 150. This current turns on transistor 190 which generates the current which produces the reverse flux in transformer 50 and, acting through the current transformer, keeps transistor 190 in the ON state. When transistor 30 again turns on, the current transformer turns off transistor 190.

What is claimed is:

1. A transformer drive circuit including
 a primary circuit and a secondary circuit and a transformer coupling said primary circuit and said secondary circuit, said transformer having a primary winding and a secondary winding, said primary winding having opposite first and second terminals,
 a source of dc voltage, said first terminal of said primary winding being coupled to said last mentioned voltage source;
 a switching transistor having an emitter, a collector, and a base, the emitter of said switching transistor being coupled to a source of reference potential, first diode means coupling the collector of said switching transistor to said second terminal of said primary winding;
 first circuit means coupled to said switching transistor for turning it on and off;
 said switching transistor, when it is turned on, driving said transformer in the forward direction along its hysteresis curve and generating an output voltage in said secondary circuit; and
 second circuit means including a second transistor having an emitter, a collector and a base, the emitter of said second transistor being connected to said second terminal of said primary winding, second diode means coupling the collector of said second transistor to said second terminal of said primary winding, the base of said second transistor being connected to the collector of said switching transistor, capacitive means coupling the collector of said second transistor to the emitter of said switching transistor, and resistive means coupling the collector and base of said second transistor to each other, said second circuit means driving said transformer in the reverse direction along its hysteresis curve when said switching transistor turns off.

2. A transformer drive circuit as defined in claim 1 characterized in that said first diode means is poled to bias and second transistor off during the on time of said switching transistor, the turn off of said switching transistor in response to said first circuit means causing said capacitive means to charge, thereby opposing said bias and permitting current flow through said resistive means to the base of said second transistor, said last mentioned transistor turning on and c ausing current to flow through said primary winding in a direction opposite to that flowing during the on time of said switching transistor.

3. A transformer drive circuit as defined in claim 2 wherein said switching transistor and said second transistor are both of the NPN conductivity type.

* * * * *